United States Patent [19]

Garcia et al.

[11] 3,763,324

[45] Oct. 2, 1973

[54] TONE DETECTOR SYSTEM

[75] Inventors: Hernando Javier Garcia, San Francisco, Calif.; Benjamin Roger Peek, Garland, Tex.

[73] Assignee: Integrated Systems Technology, Inc., Garland, Tex.

[22] Filed: Oct. 1, 1971

[21] Appl. No.: 185,518

[52] U.S. Cl. .......... 179/84 VF, 179/41 A, 325/64, 325/466

[51] Int. Cl. .......... H04b 7/00

[58] Field of Search .......... 179/1 VE, 2 DP, 2 E, 179/16 R, 16 EC, 41 A, 84 VF; 325/55, 64, 16, 312, 320, 349, 424, 430, 442, 466; 330/107, 109; 307/233, 234; 328/138, 139; 340/171 R

[56] References Cited

UNITED STATES PATENTS

| | | | |
|---|---|---|---|
| 3,336,444 | 8/1967 | Piechocki | 179/41 A |
| 3,569,744 | 3/1971 | Garrahan | 307/234 |
| 3,638,038 | 1/1972 | Weber | 307/233 |
| 3,653,018 | 3/1972 | Budrys | 307/233 |
| 3,643,173 | 2/1972 | Whitten | 330/109 |
| 3,584,275 | 6/1971 | Paulson | 330/109 |
| 3,577,201 | 5/1971 | Quatse et al. | 179/2 DP |
| 3,577,179 | 5/1971 | West | 330/107 |
| 3,440,353 | 4/1969 | Salmet | 325/55 |

*Primary Examiner*—Kathleen H. Claffy
*Assistant Examiner*—Randall P. Myers
*Attorney*—Jack A. Kanz et al.

[57] ABSTRACT

There is disclosed a tone detector system which is particularly useful in communications systems for detecting audio-frequency signalling tones transmitted from one station to another. The disclosed tone detector system includes an amplifier followed by a limiter. The limiter drives a pair of signal channels each of which includes a tuned amplifier followed by a tone-to-digital converter. The tuned amplifier in each channel is provided with a pair of frequency selective filters, one or the other of which is used depending on the operating mode of the communications equipment. Interlock circuitry cross couples the outputs of the two tone-to-digital converters so that a tone signal indicative digital output signal can appear at the output of only one of the tone signal channels at any given instant.

17 Claims, 3 Drawing Figures

PATENTED OCT 2 1973 3,763,324

SHEET 2 OF 3

TONE DETECTOR SYSTEM

BACKGROUND OF THE INVENTION

This invention relates to tone detector systems for detecting discrete audio-frequency tones and to tone-to-digital converters for converting audio-frequency tones into digital signals.

There are various communications systems which employ one or more discrete audio-frequency tones for conveying non-voice type signals between two or more locations. Examples of such systems include vehicular type mobile radio telephone systems, air-to-ground radio telephone systems and marine band radio telephone systems. Various data transmission systems and radio paging systems also employ discrete audio-frequency tones for signalling and non-voice communications purposes. In each of these systems, there exists the problem of detecting one or more discrete audio-frequency tones and converting same into a form suitable for driving a control circuit or a data processing circuit or a signalling or control device or the like. In each case, the tone detector system must be capable of reliably distinguishing between the desired tone or tones and other audio-frequency signal components which may be present.

It has been heretofore proposed to detect discrete audiofrequency tones by means of tuned circuits which utilize inductors having ferrite cores. While satisfactory performance has been obtained with such circuits, they have been found to be relatively expensive and relatively bulky for those applications where size and weight limitations are at a premium. In systems where more than one discrete frequency is involved, these problems become particularly acute.

Considering a particular representative application in greater detail, the telephone company presently provides two types of mobile radio telephone service. The older type, known as MTS (Mobile Telephone Service), requires the user of the mobile unit to call the telephone company operator who then makes the necessary connections with the land line telephone system. In the newer system, know as IMTS (Improved Mobile Telephone Service), the mobile unit is able to place and receive telephone calls automatically without having to go through the telephone company operator. In both systems, the telephone company employs a pair of audio-frequency signalling tones which are transmitted by the telephone company base station via a radio-frequency carrier for establishing a radio link-up with the mobile unit. In the MTS system, the two signalling tones are at frequencies of 600 and 1,500 hertz, while in the IMTS system they are at frequencies of 2,000 and 1,800 hertz. In the IMTS system, the 2,000 hertz tone is referred to as an "idle" tone and the 1,800 hertz tone is referred to as a "seize" tone. Among other things, the " idle" tone is used to mark an idle base station radio channel to enable the mobile unit to automatically tune in on same. Because of differences in operating procedures, the "idle" and "seize" designations are not applicable to the signalling tones employed in the older MTS system.

The majority of radio telephone mobile units in present day use are constructed for use in automobiles and other types of motor vehicles. As such, size and weight limitations on the mobile equipment have not usually been overly severe. There has recently been developed, however, a novel compact and lightweight batteryoperated portable-type radio telephone mobile unit capable of being readily hand carried from place to place by the person using same or, where desired, permanently installed in locations having severe size and weight limitations. By way of contrast, the size and weight limitations for such proposed portable-type telephone unit are considerably more severe than for an ordinary vehicular type radio telephone mobile unit. To provide maximum flexibility, such proposed portable radio telephone should be capable of use with either the manual MTS system or the automatic dialing IMTS system. To accomplish this, the portable radio telephone must include tone detector circuits capable of detecting the signalling tones for either type of system. Such tone detector circuits should be as compact, lightweight and inexpensive as possible while still possessing a relatively high degree of stability and reliability. The tone detector systems heretofore used in vehicular mobile units fail to accomplish these objectives to the degree desired for use in a hand-carried portable-type radio telephone mobile unit.

It is an object of the invention, therefore, to provide a new and improved tone detector system for detecting discrete audio-frequency tones which is more compact and less expensive than previously proposed systems but which is nevertheless relatively stable and reliable.

It is another object of the invention to provide a new and improved tone-to-digital converter for converting audio-frequency tone signals into digital signals in a reliable and accurate manner.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENT

Figure 1:
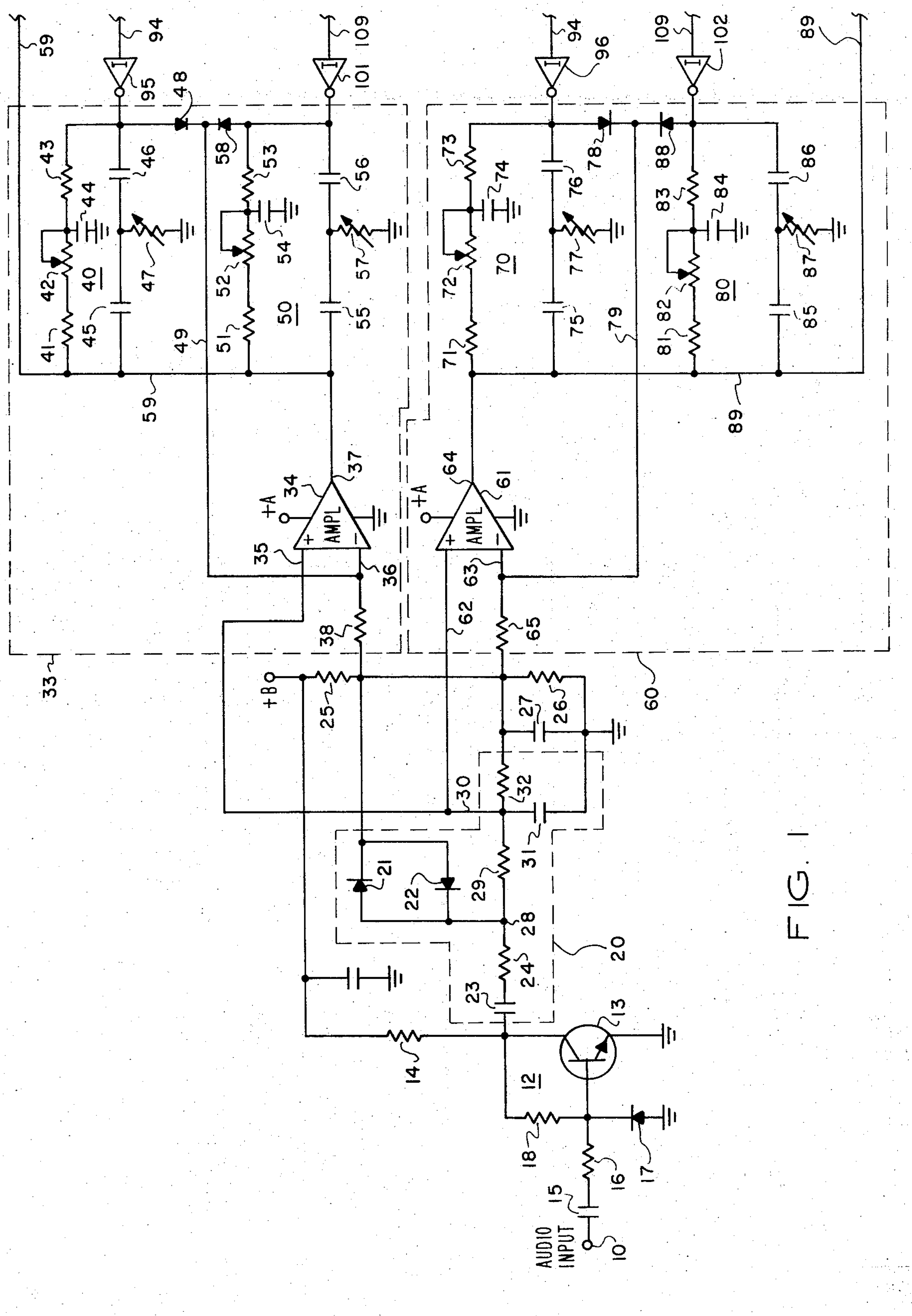
FIG. 1 is a schematic circuit diagram of a first part of a tone detector system constructed in accordance with the present invention.
Figure 2:
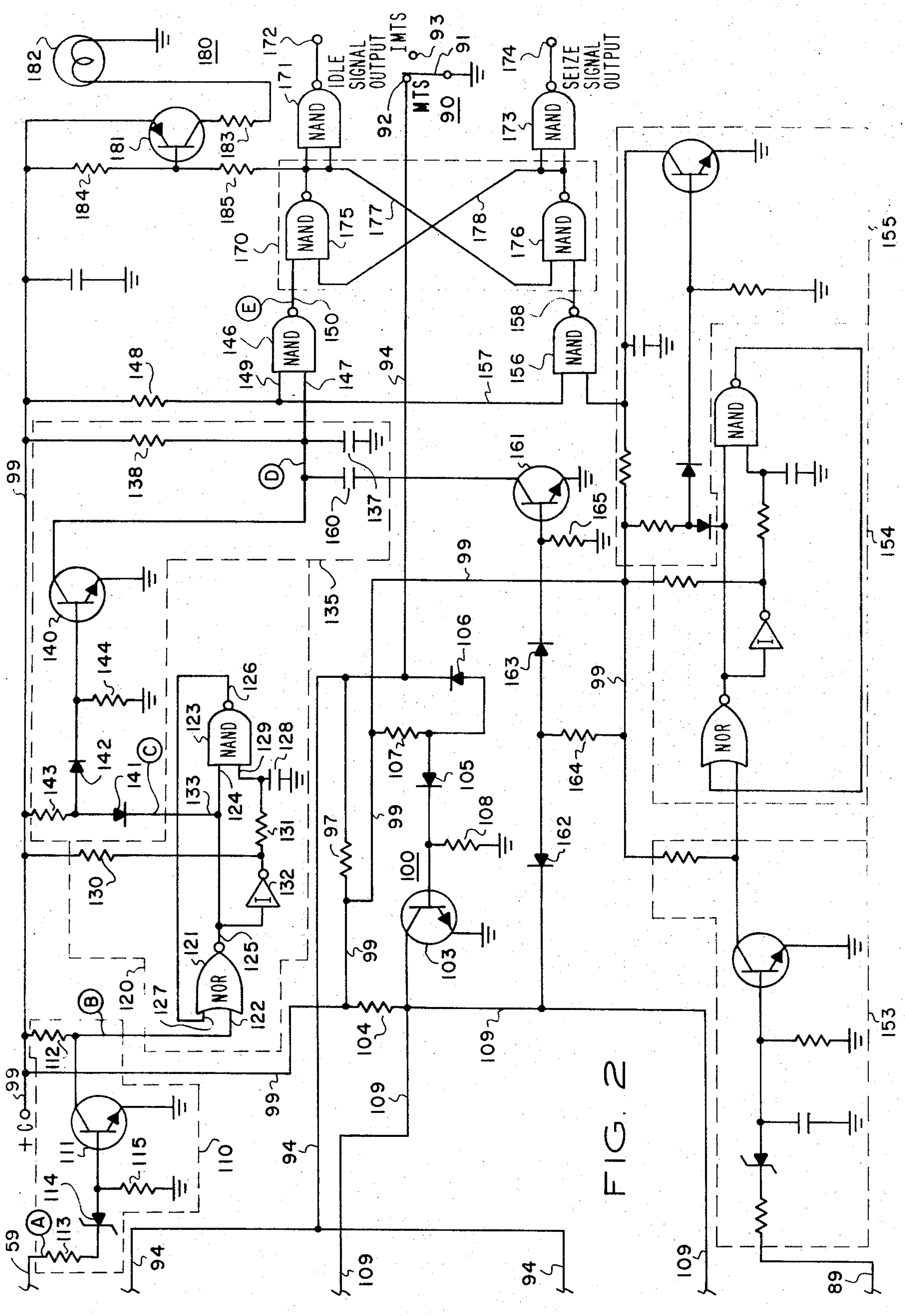
FIG. 2 is a schematic circuit diagram of the remainder of the tone detector system the first part of which is shown in FIG. 1.

FIGS. 1 and 2 illustrate a representative embodiment of a tone detector system constructed in accordance with the principles of the present invention. The illustrated system is particularly useful in a radio telephone mobile unit for detecting the audio-frequency signalling tones transmitted by either an MTS (manual) type or an IMTS (automatic dial) type telephone company base station and, for sake of an example, will be described in that context. Radio signals received from the base station are detected by the receiver circuitry in the mobile unit and the detected audio-frequency modulation components are supplied to a tone detector input terminal 10 shown at the lefthand side of FIG. 1. Terminal 10 is connected to the input of an audio-frequency amplifier 12 which includes a transistor 13 having its collector connected by way of a resistor 14 to a voltage supply terminal +B and having its emitter connected to circuit ground. Terminal 10 is connected to the base electrode of transistor 13 by capacitor 15 and resistor 16. A diode 17 is connected between the base electrode of transistor 13 and circuit ground, while a resistor 18 is connected between the base electrode and the collector electrode of transistor 13.

The amplified audio signal appearing at the collector of transistor 13 is supplied to the input of an amplitude limiter circuit 20. Limiter circuit 20 includes a pair of diodes 21 and 22 which are connected in parallel with one another in an opposite polarity manner. One end of this diode network is coupled by way of a resistor 24 and a capacitor 23 to the collector of the amplifier transistor 13. The other end of this diode network is connected to a voltage supply source or bias voltage source representated by the junction between voltage dividing resistors 25 and 26, which resistors 25 and 26 are connected between a positive direct-current supply voltage terminal +B and circuit ground. A filter capacitor 27 is connected across the lower resistor 26. Diode 21 functions to clip off and remove the positive-going peaks of the audio signal, while diode 22 functions to clip off or remove the negative-going peaks of such audio signal. The clipped or limited audio signal appears at junction point 28 and is supplied by way of a resistor 29 to an output conductor 30. A capacitor 31 is connected between output conductor 30 and circuit ground, while a resistor 32 is connected between output conductor 30 and the junction between voltage dividing resistors 25 and 26.

First frequency selective amplifier circuit means is coupled to the output of the limiter circuit 20 for selectively amplifying signal components at one of two first tone signal audio frequencies. In the present-day MTS system, the first tone signal is at a frequency of 600 hertz while in the present-day IMTS system the first tone signal is the 2,000 hertz idle tone signal. Such first frequency selective amplifier circuit means is represented by a first tuned amplifier 33 which includes a direct-coupled high-gain differential amplifier 34 having non-inverting and inverting input terminals 35 and 36, respectively, and an output terminal 37. The non-inverting input terminal 35 is connected to the limiter circuit output conductor 30, while the inverting input terminal 36 is coupled by way of a resistor 38 to the bias voltage point intermediate resistors 25 and 26. Tuned amplifier 33 also includes a first resistor-capacitor filter circuit 40 coupled between the output terminal 37 of amplifier 34 and the inverting input terminal 36 of amplifier 34 for providing a negative feedback path therebetween. Filter circuit 40 is of the twin-T type and is constructed to have a substantial dip in its signal transfer (gain versus frequency) characteristic at the 600 hertz tone frequency used in the telephone company MTS (manual) system. Filter circuit 40 includes a low pass section formed by resistors 41, 42 and 43 and capacitor 44, such low pass section being constructed to have a cutoff frequency approximately equal to the 600 hertz MTS tone frequency. Filter 40 further includes a high pass section formed by capacitors 45 and 46 and resistor 47, such high pass section being constructed to have a cutoff frequency approximately equal to the 600 hertz MTS tone frequency.

The superposition of these low and high pass characteristics of these two filter sections provides an overall frequency response having a substantial null type dip at the 600 hertz MTS tone frequency. The ideal case is that the filter 40 should pass all but the 600 hertz tone frequency, though, in practice, a useful result is obtained as long as the 600 hertz tone frequency is substantially attenuated relative to most of the other frequencies. The output side of the filter circuit 40 is connected by way of a coupling diode 48 and a conductor 49 back to the inverting input terminal 36 of amplifier 34. Thus, filter circuit 40, together with the signal inverting action of amplifier 34, provides a negative feedback loop which largely cancels all frequency components except the 600 hertz tone frequency. The 600 hertz tone frequency is not cancelled because the no-pass action of the filter circuit 40 at this frequency largely eliminates the negative feedback at this frequency.

The first tuned amplifier 33 further includes a second resistor-capacitor filter circuit 50 coupled between the output and input terminals 37 and 36 of the amplifier 34 for providing a second negative feedback path therebetween. Filter circuit 50 is of the twin-T type and is constructed to have a substantial dip in its signal transfer or frequency response characteristic at the tone frequency of the telephone company IMTS (automatic dial) system idle tone. At present, this IMTS idle tone frequency is 2,000 hertz. Twin-T filter 50 includes a low pass section formed by resistors 51, 52 and 53 and capacitor 54. Such low pass section is constructed to have a cutoff frequency approximately equal to the 2,000 hertz IMTS idle tone frequency. Filter circuit 50 further includes a high pass section formed by capacitors 55 and 56 and resistor 57, such high pass section being constructed to have a cutoff frequency approximately equal to the 2,000 hertz IMTS idle tone frequency. These low pass and high pass sections provide a composite frequency response characteristic having a substantial null at the 2,000 hertz idle tone frequency. The output side of filter circuit 50 is connected by way of a coupling diode 58 and the conductor 49 back to the inverting input terminal 36 of amplifier 34 to provide a negative feedback loop for all but the 2,000 hertz idle tone frequency.

The output signal for the first tuned amplifier 33 is the signal appearing at the output of the direct-coupled amplifier 34, which signal is supplied by way of a conductor 59 to the further circuits in the first tone signal channel. As will be seen, only one of the filter circuits 40 and 50 is used at any given time.

The illustrated tone detector system further includes second frequency selective amplifier circuit means coupled to the output of the limiter circuit 20 for selectively amplifying signal components at one of two possible second tone signal audio frequencies. In the present-day MTS system, the second tone signal is at a frequency of 1,500 hertz while in the present-day IMTS system, the second tone signal is the 1,800 hertz seize tone signal. Such second frequency selective amplifier circuit means is represented by a second tuned amplifier 60 which includes a direct-coupled high-gain differential amplifier 61 having a non-inverting input terminal 62, an inverting input terminal 63 and an output terminal 64. The non-inverting input terminal 62 is connected to the limiter circuit output conductor 30, while the inverting input terminal 63 is connected by way of a resistor 65 to the bias voltage point intermediate supply voltage resistors 25 and 26.

Tuned amplifier 60 also includes a first resistor-capacitor filter circuit 70 coupled between the output and input terminals 64 and 63 of the amplifier 61 for providing a negative feedback path therebetween. Filter circuit 70 is of the twin-T type and is constructed to have a substantial dip in its signal transfer or frequency response characteristic at the tone frequency of the second tone used in the telephone company MTS (manual) system. At the present time, such MTS tone frequency is 1,500 hertz. Twin-T filter 70 includes a low pass section formed by resistors 71, 72 and 73 and capacitor 74. Such low pass section is constructed to have a cutoff frequency approximately equal to the 1,500 hertz MTS second tone frequency. Filter circuit 70 further includes a high pass section formed by capacitors 75 and 76 and resistor 77, such high pass section being constructed to have a cutoff frequency approximately equal to the 1,500 hertz MTS tone frequency. The output side of filter circuit 70 is connected by way of a coupling diode 78 and a conductor 79 back to the inverting input terminal 63 of amplifier 61. The substantial negative feedback action at all frequencies other than the 1,500 hertz null frequency of the filter circuit 70 produces at the output 64 of amplifier 61 an amplifier 1,500 hertz tone signal to the substantial exclusion of audio-frequency signal components at other frequencies.

The second tuned amplifier 60 further includes a second resistor-capacitor filter circuit 80 coupled between the inverting input terminal 63 and the output terminal 64 of the amplifier 61 for providing a negative feedback path therebetween. Filter circuit 80 is of the twin-T type and is constructed to have a substantial dip in its signal transfer characteristic at the tone frequency of the seize tone signal used in the telephone company IMTS (automatic dial) system. At present, such IMTS seize tone frequency is 1,800 hertz. Filter circuit 80 includes a low pass section formed by resistors 81, 82 and 83 and capacitor 84 and a high pass section formed by capacitors 85 and 86 and resistor 87. Both sections are constructed to have cutoff frequencies approximately equal to the 1,800 hertz IMTS seize tone frequency. The output side of filter 80 is connected by way of a coupling diode 88 and conductor 79 back to the inverting input terminal 63 of amplifier 61. The feedback action provided by filter circuit 80 at all but the IMTS seize tone frequency produces at the output of amplifier 61 an amplified IMTS seize tone signal to the substantial exclusion of signal components at other frequencies.

The output signal for the second tuned amplifier 60 as a whole is obtained at the output terminal 64 of the direct-coupled amplifier 61 and is supplied by way of a conductor 89 to the further circuits in the second tone signal channel. As will be seen, only one of the filter circuits 70 and 80 is used at any given time.

Considering now the manner of selecting the particular ones of filter circuits 40, 50 70 and 80 which are to be used, the tone detector system includes a mode selector switch 90 (righthand side of FIG. 2) for signifying selection of a particular one of the two operating modes for the radio telephone mobile unit. Switch 90 includes a switchblade 91 which is set to contact position 92 when it is desired to operate in the MTS (manual) mode and is set to contact position 93 when it is desired to operate in the IMTS (automatic dial) mode. The tone detector system further includes control circuit means coupled to the mode selector switch 90 and to the filter circuits 40, 50, 70 and 80 in the tuned amplifiers 33 and 60 for enabling the MTS mode filters 40 and 70 and disabling the IMTS mode filters 50 and 80 in the MTS operating mode and, conversely, for enabling the IMTS filters 50 and 80 and disabling the MTS filters 40 and 70 in the IMTS operating mode.

This control circuit means includes conductor means 94 which connects the inputs of a pair of digital inverter circuits 95 and 96 (FIG. 1) to the MTS contact 92 of switch 90. Inverter circuits 95 and 96 are "open collector" type devices which provide an open circuit condition at their output terminals when their input terminals are at a ground level and, conversely, provide a circuit ground condition at their output terminals when their input terminals are at a positive voltage level of a few volts. A resistor 97 (FIG. 2) is connected between the mode switch conductor means 94 and a voltage supply conductor means 99 which runs to a positive direct-current supply voltage terminal +C. The output of digital inverter 95 is connected to the first tone MTS filter 40 at a point intermediate the output side of such filter 40 and the coupling diode 48. The output of the second digital inverter circuit 96 is similarly connected to the second tone MTS filter 70 at a point intermediate the output side of such filter 70 and the coupling diode 78.

The portion of the mode control circuit thus far described controls the enabling and disabling of the MTS (manual) mode filters 40 and 70. The setting of mode selector switch 90 to the MTS position 92 grounds the mode switch conductor means 94 which, in turn, grounds the inputs of the digital inverter circuits 95 and 96. This causes the output terminals of inverter circuits 95 and 96 to assume an open circuit condition. This renders coupling diodes 48 and 78 conductive. This enables filter circuits 40 and 70 and allows audio-frequency signal components to pass by way of coupling diodes 48 and 78 back to the inverting inputs 36 and 63 of amplifiers 34 and 61, respectively.

When, on the other hand, the switchblade 91 of mode selector switch 90 is set to the IMTS (automatic dial) contact position 93, the mode switch conductor means 94 becomes ungrounded and the resistor 97 places this conductor means 94 at a positive direct-current voltage level of +C. This causes the outputs of inverter circuits 95 and 96 to go to a voltage level of zero. This turns off or renders non-conductive the coupling diodes 48 and 78 which, in turn, disables or disconnects the MTS filter circuits 40 and 70.

The IMTS (automatic dial) mode filters 50 and 80 are controlled in a converse manner by a digital inverter circuit 100 which is connected between the mode switch conductor means 94 and a second pair of filter controlling digital inverter circuits 101 and 102. Inverter circuit 100 includes a transistor 103 having its collector connected to the +C supply voltage conductor means 99 by way of a resistor 104 and having its emitter connected to circuit ground. The base electrode of transistor 103 is connected to the mode switch conductor means 94 by way of opposite polarity diodes 105 and 106. A resistor 107 is connected between a point intermediate diodes 105 and 106 and the supply voltage conductor means 99, while a resistor 108 is connected between the base electrode of transistor 103 and circuit ground. The collector of transistor 103 is also connected by way of conductor means 109 to the inputs of the digital inverter circuits 101 and 102. The outputs of digital inverter circuits 101 and 102 are connected to the IMTS mode filter circuits 50 and 80, respectively, at points intermediate the output sides of such filter circuits and the coupling diodes 58 and 88. Inverter circuits 101 and 102 are "open collector" type devices and, as such, function in the same manner as the previously-considered inverter circuits 95 and 96.

When switchblade 91 of mode selector switch 90 is set to the MTS contact position 92, conductor 94 is grounded and current flows from the supply voltage conductor 99 through resistor 107 and diode 106 to circuit ground. This places the junction point between diodes 105 and 106 at almost ground potential. This renders diode 105 non-conductive. This causes the transistor 103 to be non-conductive which, in turn, causes the voltage on the conductor means 109 to assume a direct-current value of +C volts. This causes the outputs of digital inverter circuits 101 and 102 to go to a voltage level of zero. This turns off or renders non-conductive the coupling diodes 58 and 88 which, in turn, disables or disconnects the IMTS filter circuits 50 and 80. Thus, the second set of filter circuits 50 and 80 are disabled at the same time that the first set of filter circuits 40 and 70 are being enabled, this taking place during the MTS (manual) operating mode.

When the switchblade 91 of mode selector switch 90 is set to the IMTS contact position 93, the mode switch conductor means 94 becomes ungrounded and resistor 97 causes such conductor means 94 to go to a voltage level of +C volts. This turns off the diode 106 and allows current to flow by way of resistor 107, diode 105 and resistor 108 to circuit ground. This turns on the transistor 103 which then, in effect, shorts to ground the conductor means 109. The resulting zero voltage on conductor means 109 causes the output terminals of inverter circuits 101 and 102 to assume an open circuit condition. This renders conductive the coupling diodes 58 and 88. This enables IMTS filter circuits 50 and 80 and allows audio-frequency signals to pass back to the inverting inputs of amplifiers 34 and 61, respectively. At the same time, the first set of filter circuits 40 and 70 are maintained in a disabled condition by the zero level voltages then appearing at the outputs of inverters 95 and 96.

The remainder of the first tone signal channel connected to the output of the first tone signal tuned amplifier 33 is comprised principally of a tone-to-digital converter for producing a unique and distinctive digital output signal during the occurrence of a first tone signal at the input terminal 10 of the tone detector system. This tone-to-digital converter for the first tone signal channel includes a peak detector circuit 110 responsive to the tone signal appearing at the output of tuned amplifier 33 (on conductor 59 in FIG. 2) for producing output pulses coincident with the peak portions of a given polarity of each cycle of such tone signal which exceed a predetermined amplitude level. Peak detector circuit 110 includes a transistor 111 having its collector connected by way of resistor 112 to the +C supply voltage line 99 and having its emitter connected to circuit ground. The base electrode of transistor 111 is connected to the output conductor 59 coming from tuned amplifier 33 by means of a resistor 113 and a Zener diode 114. A resistor 115 is connected between the base electrode of transistor 111 and circuit ground.

Figure 3:
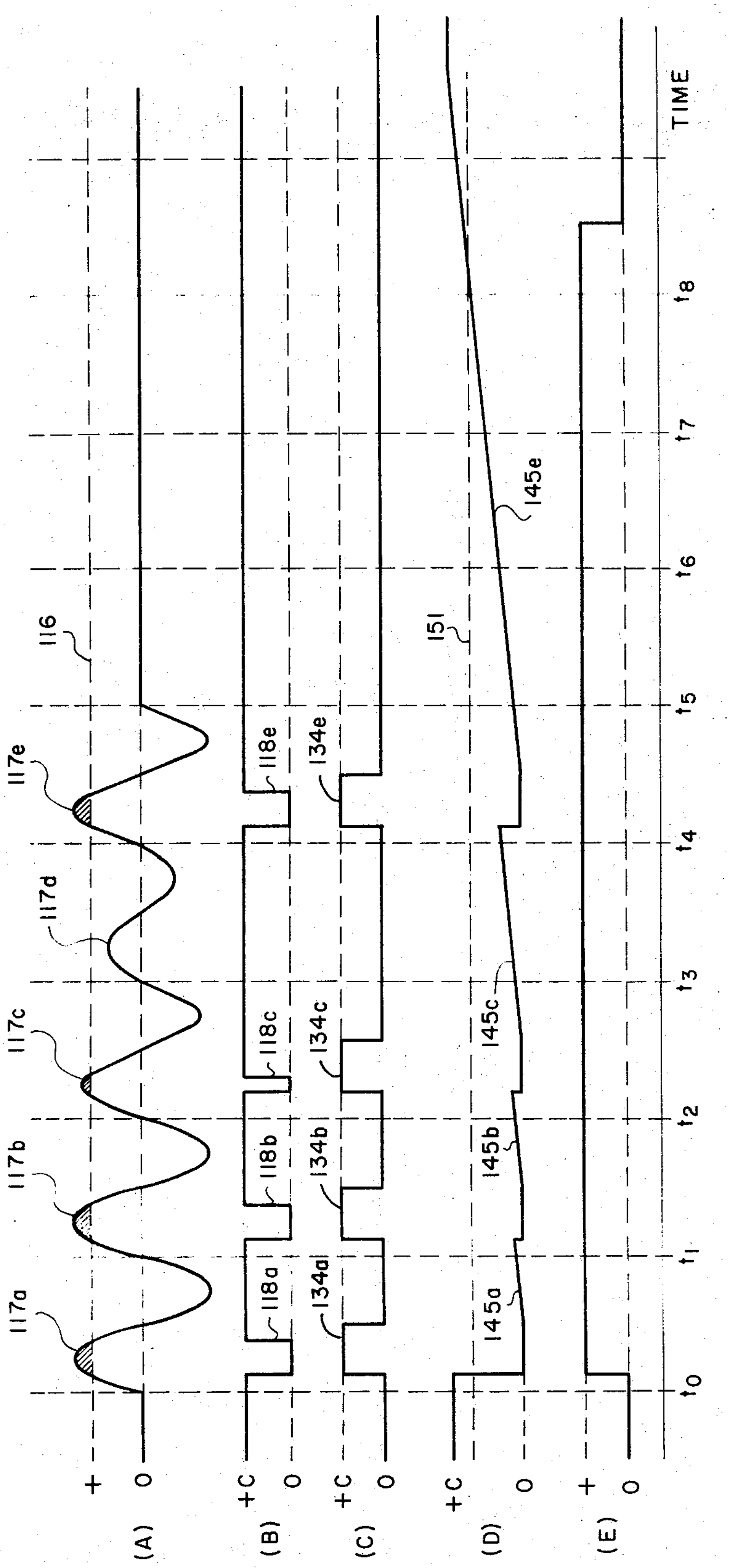
FIG. 3 shows typical signal waveforms for electrical signals developed at different points in the tone detector system of FIGS. 1 and 2.

An illustrative case for the sinusoidal tone signal appearing at the input of peak detector circuit 110 (on conductor 59) is represented by waveform A of FIG. 3. The corresponding peak detector circuit output pulses appearing at the collector of transistor 111 are represented by waveform B of FIG. 3. When the tone signal (waveform A) is of negative polarity, transistor 111 is non-conductive and its collector is at a digital level of +C volts. When the sinusoidal tone signal is of positive polarity but of instantaneous amplitude less than the breakdown voltage of the Zener diode 114 (indicated by voltage level 116 in waveform A of FIG. 3), Zener diode 114 is substantially non-conductive and transistor 111 is also non-conductive. When the input tone signal is of positive polarity and the instantaneous amplitude thereof exceeds the breakover level 116 of the Zener diode 114, such diode becomes conductive and the resulting current flow through resistor 115 renders the transistor 111 conductive. At this time, the voltage level at the collector of transistor 111 falls to a value of substantially zero. Thus, there appears at the collector of transistor 111 a series of negative-going pulses 118*a*, 118*b*, 118*c* and 118*e* (waveform B) which are coincident in time with the positive polarity portions 117*a*, 117*b*, 117*c* and 117*e* of the input tone signal (waveform A) which exceed the Zener breakover level 116. It is noted that the positive peak 117*d* of the fourth tone signal cycle in waveform A is less than breakover level 116. Consequently, there is no peak detector output pulse for this cycle.

The tone-to-digital converter for the first tone signal channel further includes a pulse generator circuit 120 responsive to each output pulse from the peak detector circuit 110 for producing a pulse of fixed minimum duration. This minimum duration is determined by a time constant within pulse generator circuit 120. If the duration of the output pulse from peak detector circuit 110 is greater than this minimum duration, then the duration of the pulse produced by pulse generator 120 is equal to the duration of such peak detector pulse. Pulse generator circuit 120 is a digital logic type monostable multivibrator circuit and includes a two-input NOR circuit 121 having a first input 122 connected to the output of the peak detector circuit 110. Pulse generator 120 further includes a two-input NAND circuit 123 having a first input 124 connected to the output 125 of the NOR circuit 121 and having an output 126 connected to the second input 127 of the NOR circuit 121. Pulse generator 120 further includes a timing capacitor 128 connected to a second input 129 of the NAND circuit 123. Pulse generator 120 also includes resistors 130 and 131 which are connected in series between the +C supply voltage line 99 and the upper side of timing capacitor 128, the lower side of timing capacitor 128 being connected to circuit ground. Pulse generator 120 further includes an inverter circuit 132 having its input connected to the output 125 of the NOR circuit 121 and having its output connected to a junction point intermediate resistors 130 and 131. The output signal for the pulse generator 120 appears on output conductor 133, which conductor 133 is connected to the output 125 of NOR circuit 121.

The logic of NOR circuit 121 is such that the voltage level at output 125 will be high if the voltage level at either or both of inputs 122 and 127 is low. If both inputs are high, then the output 125 will be low. The logic of NAND circuit 123 is such that the voltage level at output terminal 126 will be low only if the voltage level at both of the inputs 124 and 129 is high. Otherwise, the voltage level at output 126 will be high. A typical input signal received by the pulse generator 120 at input 122 of NOR circuit 121 is represented by waveform B of FIG. 3. The corresponding output signal on output conductor 133 of the pulse generator 120 is represented by waveform C of FIG. 3.

In the absence of the first tone signal (600 or 2,000 hertz, depending on the operating mode) at system input terminal 10, the voltage appearing at input 122 of NOR circuit 121 is at a high level of +C volts. At the same time, the voltage at the second input 127 is also high. Consequently, the voltage level at output 125 of NOR circuit 121 is low (zero volts). At this time, the timing capacitor 128 is charged up so that the voltage level at NAND circuit input 129 is high. Because the voltage at the other NAND circuit input 124 is low, the output of NAND circuit 123 is high.

Upon the appearance of the first cycle of a tone signal on the input conductor 59 for peak detector circuit 110 which is in excess of the Zener breakover level 116, there is produced a negative-going pulse **118*a* (waveform B) which is supplied to input 122 of NOR circuit 121. This pulse 118*a* drops the voltage level at NOR circuit input 122 to a low level. This causes the voltage at NOR circuit output 125 to go to a high level. This places both inputs to NAND circuit 123 at a high level, causing the output 126 thereof to go to a low level. This low level is fed back to the second input 127 of the NOR circuit 121 and keeps the NOR circuit output 125 high following termination of the input pulse 118*a* if such pulse is of less than the discussed fixed minimum duration. The high level voltage at NOR circuit output 125 causes inverter 132 to produce a low voltage level of, for example, zero volts at the output of such inverter 132. As a consequence, timing capacitor 128 commences to discharge through the resistor 131. This discharge continues until the voltage at the input 129 of NAND circuit 123 falls below the minimum level needed to keep the NAND circuit 123 "turned on" (output low). When this happens, the output of NAND circuit 123** returns to its original high level.

If the peak detector output pulse **118*a* has terminated at the time the output of NAND circuit 123 returns to a high level, then the NOR circuit 121 is returned to its original condition where both inputs are high and the output is low. The latter event returns the output of inverter 132 to a high level and the timing capacitor 128 charges back up to its original high level. In terms of input and output waveforms B and C, the resistor-capacitor time constant circuit provided by resistor 131 and capacitor 128, together with the threshold level of NAND circuit 123, keeps the output waveform C at a high level for a predetermined length of time after termination of each negative-going input pulse 118*a*, 118*b*, etc. This is the case illustrated in FIG. 3. If, on the other hand, the peak detector output pulse has not terminated when the output of NAND circuit 123 returns to a high level, then the output of NOR circuit 121 remains high until such peak detector output pulse terminates. In this case, the duration of the pulse generator output pulse on output conductor 133 is equal to the duration of the peak detector output pulse appearing at NOR circuit input 122**.

The first tone signal channel tone-to-digital converter further includes a time constant circuit 135 which is responsive to the pulses produced by the pulse generator circuit 120 for producing an output signal which does not exceed a predetermined level so long as the time interval between successive pulse generator pulses does not exceed a predetermined value on the order of four to six times the period of a tone signal cycle. This time constant circuit 135 includes a capacitor 137 and resistive charging circuit means represented by resistor 138 for charging the capacitor 137. Capacitor 137 and resistor 138 are connected in series between supply voltage conductor 99 and circuit ground. In the absence of a tone signal on output conductor 59 of tuned amplifier 33, capacitor 137 is in a charged condition and the voltage at the ungrounded upper terminal thereof is at a high level (+C volts). Time constant circuit 135 further includes a transistor 140 coupled to the capacitor 137 for discharging and maintaining discharged the capacitor 137 during the occurrence of a positive-going output pulse from pulse generator 120. The collector of transistor 140 is connected to the upper terminal of capacitor 137 while the emitter of transistor 140 is connected to circuit ground. Transistor 140 acts like a switch and, when conductive, serves to, in effect, ground the upper terminal of the capacitor 137. The fixed minimum duration of the pulses from pulse generator 120 is selected to provide adequate time for the substantially complete discharge of capacitor 137. The base electrode of transistor 140 is connected to the output conductor 133 of pulse generator 120 by way of series-connected oppositely-poled diodes 141 and 142. A resistor 143 is connected between the junction between diodes 141 and 142 and the supply voltage conductor means 99. A further resistor 144 is connected between the base electrode of transistor 140 and circuit ground.

A typical signal at the input (conductor 133) of time constant circuit 135 is represented by waveform C of FIG. 3, while the corresponding signal at the output (upper terminal of capacitor 137) of time constant circuit 135 is represented by waveform D. When no tone signal is present on output conductor 59 of tuned amplifier 33, time constant circuit input conductor 133 is at a zero voltage level. Current then flows by way of resistor 143 and diode 141 to this zero level point. This places the junction between resistor 143 and diode 141 at a low level. This renders diode 142 non-conductive which, in turn, renders transistor 140 non-conductive. During the occurrence of one of the pulse generator pulses **134*a*, 134*b*, etc., the high voltage level on conductor 133 turns off the diode 141. Current then flows by way of resistor 143, diode 142 and resistor 144 to circuit ground. The voltage drop across resistor 144 turns on the transistor 140. This grounds the upper terminal of capacitor 137 and thus causes the output voltage (waveform D) of time constant circuit 135 to rapidly go to a substantially zero level. During the time intervals intermediate pulse generator pulses 134*a*, 134*b*, etc., transistor 140 is turned off and capacitor 137 starts to charge by way of resistor 138. This charging of capacitor 137 is represented by sloping portions 145*a*, 145*b*, 145*c* and 145*e* of waveform D of FIG. 3. Because of the time constant provided by capacitor 137 and resistor 138, the capacitor 137 does not normally have a chance to charge up very much before the transistor 140 is again rendered conductive during the occurrence of the next succeeding one of pulse generator pulses 134***a*, 134*b*, etc.

The tone-to-digital converter portion of the first tone signal channel also includes level sensitive bistable circuit means coupled to the output of the time constant circuit 135 for producing a distinctive and non-varying output signal during the occurrence of a proper first tone signal at the system input terminal 10. In the present embodiment, this level sensitive bistable circuit means is a digital logic type Schmitt trigger circuit which includes a two input coincidence type logic circuit represented by NAND circuit 146 and having one input terminal 147 connected to the output of the time constant circuit 135. The Schmitt trigger circuit further includes circuit means represented by a resistor 148 for supplying a steady enabling signal to the other input terminal 149 of the NAND circuit 146. NAND circuit 146 provides a Schmitt trigger action in that its output terminal 150 will be at a first voltage level whenever the signal at input terminal 147 is below a certain threshold value and will be at a second voltage level whenever the signal at input terminal 147 is above this threshold level.

The threshold level for input terminal 147 of Schmitt trigger NAND circuit 146 is represented by broken line 151 of waveform D. This threshold level 151 is set so that the NAND circuit 146 will not respond to the charging of capacitor 137 (sloping portions 145*a*, 145*b* and 145*c* of waveform D) occurring intermediate the pulse generator pulses 134*a*, 134*b*, 134*c* and 134*e* (waveform C), provided such pulse generator pulses are spaced not more than four to six tone signal cycles apart. In other words, the values of capacitor 137, resistor 138 and Schmitt trigger threshold level 151 are selected so that a time interval equal to somewhere on the order of the period of four to six tone signal cycles is required to charge capacitor 137 from a zero level to the Schmitt trigger threshold level 151. The digital signal at the output 150 of NAND circuit 146 is represented by waveform E of FIG. 3. In the present embodiment, this digital output signal is at a steady positive direct-current voltage level during the occurrence of a proper tone signal at system input terminal 10 and, with one minor exception, is at a zero voltage level when the proper tone signal is not present at system input terminal 10. The exception is that the digital output signal (waveform E) remains at the positive level for a brief interval (approximately four to six tone signal cycles) after the disappearance of the proper tone signal, this being caused by the time required to charge capacitor 137 to the Schmitt trigger threshold level 151 following termination of the tone signal burst. Note also that if one or two cycles (for example, the fourth cycle of waveform A) of the tone signal fall below the threshold level established by Zener diode 114, the digital output signal (waveform E) remains undisturbed.

The tone detector system further includes a second tone-to-digital converter coupled to the output conductor 89 of the second tone signal tuned amplifier 60 for producing a distinctive digital output signal during the occurrence of a proper second tone signal at system input terminal 10. This tone-to-digital converter for the second tone signal channel includes in cascade a peak detector circuit 153, a pulse generator circuit 154, a time constant circuit 155 and a level sensitive bistable circuit formed by NAND circuit 156. The enabling voltage for the second input of NAND circuit 156 is supplied thereto by way of resistor 148 and conductor 157. Peak detector circuit 153, pulse generator circuit 154, time constant circuit 155 and NAND circuit 156 are of the same construction and operate in the same manner as the corresponding ones of peak detector circuit 110, pulse generator circuit 120, time constant circuit 135 and NAND circuit 146 in the previously considered first tone signal channel. Consequently, these second tone signal converter circuits will not be discussed in detail herein. Suffice it to say that there is produced at output 158 of NAND circuit 156 a digital output signal having a steady positive direct-current value during the occurrence of a proper second tone signal (1,500 hertz for MTS mode and 1,800 hertz for IMTS mode) at the system input terminal 10 and having a zero value during the absence of a proper second tone signal at system input terminal 10.

There is one more or less relatively minor difference between the first tone signal and the second tone signal tone-to-digital converters. In particular, the time constant circuit 135 in the first tone signal converter includes an additional capacitor 160 which is placed in parallel with the capacitor 137 during the MTS (manual) operating mode. This provides a somewhat longer time constant for the MTS mode. This is needed because of the relatively large difference in the tone frequencies of the first tone signals used in the two modes.

The connecting and disconnecting of the additional capacitor 160 is controlled by a transistor 161 which, when conductive, serves to, in effect, ground the lower terminal of the capacitor 160. The base electrode of transistor 161 is coupled to the tuned amplifier control signal conductor 109 by way of series-connected oppositely-poled diodes 162 and 163. A resistor 164 is connected between the junction between diodes 162 and 163 and the +C supply voltage conductor means 99. A resistor 165 is connected between the base electrode of transistor 161 and circuit ground.

When the mode selector switch 90 is in the MTS position 92, control signal conductor 109 is at a voltage level of +C volts. As a consequence, diode 162 is rendered non-conductive and current flows by way of resistor 164, diode 163 and resistor 165 to circuit ground. The voltage drop across resistor 165 turns on the transistor 161 and the collector-to-emitter portion thereof shorts the lower terminal of capacitor 160 to circuit ground. When, on the other hand, mode selector switch 90 is set to the IMTS position 93, the control signal conductor 109 goes to a voltage level of zero volts. This turns on the diode 162 and current flows by way of resistor 164, diode 162, conductor 109 and transistor 103 to circuit ground. At this time, the junction between resistor 164 and diode 162 is at a low voltage level and the diode 163 is turned off. This turns off the transistor 161 and, in effect, removes the additional capacitor 160 from the time constant circuit 135.

The output terminal 150 of converter NAND circuit 146 in the first tone signal channel is connected by way of an interlock system 170 and a NAND circuit 171 to an output terminal 172 which serves as the first tone signal output terminal for the tone detector system as a whole. The output terminal 158 of the converter NAND circuit 156 in the second tone signal channel is connected by way of the interlock system 170 and a NAND circuit 173 to an output terminal 174 which serves as the second tone signal output terminal for the tone detector system as a whole. Interlock system 170 includes a first digital logic circuit, represented by NAND circuit 175, which is connected in series between the output of converter NAND circuit 146 and the input of NAND circuit 171 in the first tone signal channel. Interlock system 170 further includes a second digital logic circuit, represented by NAND circuit 176, which is connected in series between the output of converter NAND circuit 156 and the input of NAND circuit 173 in the second tone signal channel. Interlock system 170 also includes circuit means, represented by conductors 177 and 178, for cross-coupling the inputs and outputs of the digital logic NAND circuits 175 and 176 for preventing tone signal indicative digital output signals from simultaneously appearing at both of the system output terminals 172 and 174. The logic of each of the NAND circuits 175 and 176 is that it will produce a low level output voltage only if the voltage level at both of its inputs are at a high level. Otherwise, the output voltage will be at a high level.

Neglecting for the moment the cross-coupling conductors 177 and 178 and assuming that the second input of each of the NAND circuits 175 and 176 is at a high level, then when a proper first tone signal is present at the system input terminal 10, the output of converter NAND circuit 146 is at a high level. This places the output of interlock NAND circuit 175 at a low level. This places the output of NAND circuit 171 at a high level. Conversely, in the absence of a proper first tone signal at terminal 10, the output of converter NAND circuit 146 is low, the output of interlock NAND circuit 175 is high and the output of NAND circuit 171 is low. Thus, the signal at system output terminal 172 varies in the same manner as the signal at the output 150 of converter NAND circuit 146. Similar considerations apply for the NAND circuits 156, 176 and 173 in the second tone signal channel.

The effect of the cross-coupling conductors 177 and 178 will now be considered. With neither a proper first tone signal nor a proper second tone signal present at system input terminal 10, the output of each of converter NAND circuits 146 and 156 is at a low level. This forces the output of each of the interlock NAND circuits 175 and 176 to a high level. The high level at the output of the first channel interlock NAND circuit 175 provides the desired high level enabling signal for the second input of the second channel interlock NAND circuit 176. Similarly, the high level at the output of the second channel interlock NAND circuit 176 provides the desired high level enabling signal for the second input of the first channel interlock NAND circuit 175. Thus, both of the interlock NAND circuits 175 and 176 are armed and ready to react in case its respective tone signal should be received.

Assume now that a first tone signal is the first to arrive. Such arrival causes the output of converter NAND circuit 146 to go to a high level. This causes the output of interlock NAND circuit 175 to go to a low level which, in turn, produces a high level output signal at the first channel system output terminal 172. At the same time, the low signal level at the output of interlock NAND circuit 175 serves to disable the interlock NAND circuit 176 in the second tone channel. Thus, if a second tone indicative signal should appear at the output of the second channel NAND circuit 156 while the first tone indicative signal is still present at the output of NAND circuit 146, such second tone signal will have no effect on the signal level at the second channel system output terminal 174 because of the disabled condition of interlock NAND circuit 176. Assuming that a proper second tone signal is being received, a digital indication thereof will not appear at the second tone output terminal 174 until the output level of first channel NAND circuit 146 returns to a low value.

Conversely, if the second tone signal arrives first, then the interlock NAND circuit 175 in the first tone channel is disabled until such time as the output of the second channel NAND circuit 156 returns to a low level. Thus, the interlock system 170 prevents the simultaneous appearance of tone indicative digital signal levels at both of the system output terminals 172 and 174.

In accordance with present practice, the telephone company does not deliberately transmit both first and second tones at the same time. It may transmit one or the other but not both simultaneously. The interlock system 170 is nevertheless useful because of the previously discussed momentary time lag in "turning off" the first channel NAND circuit 146 following termination of the first tone signal and the brief time lag in "turning off" the second channel NAND circuit 156 following termination of the second tone signal.

The tone detector system of the present embodiment further includes an indicator circuit 180 for providing a visual indication of the occurrence of a proper first tone signal. Indicator circuit 180 includes a transistor 181 which controls a light bulb or incandescent lamp 182. The emitter of transistor 181 is connected to the +C supply voltage conductor 99, while the collector thereof is connected by way of a resistor 183 to one terminal of the lamp 182, the other terminal of lamp 182 being connected to circuit ground. A resistor 184 is connected between the +C conductor 99 and the base electrode of transistor 181, while a resistor 185 is connected between the base electrode of transistor 181 and the output of the first channel interlock NAND circuit 175.

When no first tone signal indication is present at the output of NAND circuit 175, such output is at a voltage level of +C volts. In such case, there is substantially no current flow through resistor 184 and transistor 181 remains non-conductive. As a consequence, lamp 182 remains unlit. When, on the other hand, a first tone indicative signal appears at the output of NAND circuit 175, such output is at a voltage level of zero volts. As a consequence, current flows from the +C supply voltage conductor 99, by way of resistors 184 and 185 to the zero level point at the output of NAND circuit 175. The resulting voltage drop across resistor 184 turns on the transistor 181 which, in turn, causes the lamp 182 to light up. In the IMTS (automatic dial) operating mode, the lighting of lamp 182 tells the operator of the mobile telephone unit that his mobile unit is tuned to an idle radio telephone channel and that he can go ahead and make his call. When operating in the MTS (manual) mode, lamp 182 blinks during the "dialing" portion of an incoming call. This tells the mobile operator that it is undesirable for him to take his telephone handset off hook at this point in time.

The digital tone indicative signals appearing at system output terminals 172 and 174 are used by other portions of the radio telephone mobile unit. For example, in an automatic dial system, the telephone company calls the mobile unit by transmitting number modulated series of 2,000 hertz idle tone bursts and 1,800 hertz seize tone bursts and the resulting digital pulses appearing at the first or "idle" signal system output terminal 172 and the second or "seize" signal output terminal 174 are supplied to a pulse counting decoder system in the mobile unit for determining whether the mobile unit in question is the one being called.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A tone detector system for communications receiving equipment for detecting a tone signal transmitted by communications transmitting equipment comprising:

circuit means for supplying audio signals received from the transmitting equipment and detected by the receiving equipment;

frequency selective amplifier circuit means coupled to the audio signal supply circuit means and selectively responsive to signal components at the tone frequency of the tone signal for producing an amplified tone signal;

peak detector circuit means responsive to the amplified tone signal for producing output pulses coincident with the peak portions of a given polarity of each cycle of the tone signal which exceed a predetermined level;

pulse generator circuit means responsive to each peak detector output pulse for producing a pulse of fixed minimum duration;

time constant circuit means responsive to the pulses produced by the pulse generator circuit means for producing an output signal which does not exceed a predetermined level so long as the time interval between successive pulse generator pulses does not exceed a predetermined value;

and level sensitive bistable circuit means coupled to the output of the time constant circuit means for producing a distinctive and non-varying output signal during the occurrence of said tone signal.

2. A tone detector system in accordance with claim 1 wherein the frequency selective amplifier circuit means includes:

direct-coupled amplifier circuit means having an input circuit coupled to the audio signal supply circuit means;

resistor-capacitor filter circuit means coupled between an input and an output circuit of the direct-coupled amplifier circuit means for providing a negative feedback path therebetween, such filter circuit means being constructed to have a substantial dip in its signal transfer characteristic at the tone frequency of the tone signal;

and circuit means for coupling the output of the direct-coupled amplifier circuit means to the input of the peak detector circuit means.

3. A tone detector system in accordance with claim 2 wherein the resistor-capacitor filter circuit means is a twin-T filter circuit consisting solely of resistors and capacitors.

4. A tone detector system in accordance with claim 2 wherein the resistor-capacitor filter circuit means comprises a twin-T filter circuit wherein one T section is a low pass filter for passing signal components at frequencies less than the tone frequency of the tone signal and the other T section is a high pass filter for passing signal components at frequencies greater than the tone frequency of the tone signal.

5. A tone-to-digital converter comprising:

circuit means for supplying a tone signal;

peak detector circuit means responsive to the tone signal for producing output pulses coincident with the peak portions of a given polarity of each cycle of the tone signal which exceed a predetermined level;

pulse generator circuit means responsive to each peak detector output pulse for producing a pulse of fixed minimum duration;

time constant circuit means responsive to the pulses produced by the pulse generator circuit means for producing an output signal which does not exceed a predetermined level so long as the time interval between successive pulse generator pulses does not exceed a predetermined value;

and level sensitive bistable circuit means coupled to the output of the time constant circuit means for producing a distinctive and non-varying output signal during the occurrence of said tone signal.

6. A tone-to-digital converter in accordance with claim 5 wherein the peak detector circuit means includes:

a grounded emitter transistor circuit having its collector circuit coupled to the input of the pulse generator circuit means;

and Zener diode means coupled in series between the tone signal supply circuit means and the base electrode circuit of the transistor circuit for passing thereto signal components of a first polarity which exceed a predetermined amplitude level.

7. A tone-to-digital converter in accordance with claim 5 wherein the time constant circuit means includes capacitor means and the pulse generator circuit means is constructed to produce pulses of fixed minimum duration, which minimum duration is sufficient to discharge the capacitor means.

8. A tone-to-digital converter in accordance with claim 5 wherein the pulse generator circuit means is a monostable multivibrator circuit.

9. A tone-to-digital converter in accordance with claim 5 wherein the pulse generator circuit means includes:

NOR circuit means having a first input coupled to the output of the peak detector circuit means;

NAND circuit means having a first input coupled to the output of the NOR circuit means and having an output coupled to a second input of the NOR circuit means;

capacitor means coupled to a second input of the NAND circuit means;

inverter circuit means having an input coupled to the output of the NOR circuit means;

impedance means coupled between the output of the inverter circuit means and the second input of the NAND circuit means for charging and discharging the capacitor means;

and circuit means for supplying the signal appearing at the output of one of the NOR and NAND circuit means to the time constant circuit means.

10. A tone-to-digital converter in accordance with claim 5 wherein the time constant circuit means includes:

capacitor means;

resistive charging circuit means for charging the capacitor means;

transistor means coupled to the capacitor means and responsive to the pulses produced by the pulse generator circuit means for maintaining the capacitor means discharged during the occurrence of the pulse generator pulses;

and circuit means for supplying the signal across the capacitor means to the input of the level sensitive bistable circuit means.

11. A tone-to-digital converter in accordance with claim 5 wherein the level sensitive bistable circuit means is a Schmitt trigger circuit.

12. A tone-to-digital converter in accordance with claim 5 wherein the level sensitive bistable circuit means is a digital logic type Schmitt trigger circuit and includes:

a plural input coincidence type logic circuit having one input coupled to the output of the time constant circuit means;

and circuit means for supplying a steady enabling signal to the other input of the coincidence type logic circuit means.

13. A tone detector system for a radio telephone mobile unit for detecting first and second audio-frequency tone signals transmitted by a base station comprising:

circuit means for supplying audio signals received from the base station and detected by the mobile unit;

first tuned amplifier circuit means coupled to the audio signal supply circuit means for selectively amplifying signal components of the first audio frequency tone of one of two signal pairs, each signal pair having first and second audio frequency tones, such first tuned amplifier circuit means including first and second filter circuit means, said first filter circuit means of said first tuned amplifier circuit generating an output in response to the frequency of the first tone signal of the first signal pair, and said second filter circuit means of said first tuned amplifier circuit generating an output in response to the frequency of the first tone signal of the second signal pair;

second tuned amplifier circuit means coupled to the audio signal supply circuit means for selectively amplifying signal components of the second audio frequency tone of one of two signal pairs, each signal pair having first and second audio frequency tones, such second tuned amplifier circuit means including first and second filter circuit means, said first filter circuit means of said second tuned amplifier circuit generating an output in response to the frequency of the second tone signal of the first signal pair and said second filter circuit means of said second tuned amplifier circuit generating an output in response to the frequency of the second tone signal of the second signal pair;

a mode selector switch for signifying selection of a particular one of two operating modes for the mobile unit;

and control circuit means coupled to the mode selector switch and to the filter circuit means in the first and second tuned amplifier circuit means for enabling the first filter circuit means in each tuned amplifier circuit means and disabling the second filter circuit means in each tuned amplifier circuit means in one mobile unit operating mode and for enabling the second filter circuit means and disabling the first filter circuit means in the other mobile unit operating mode.

14. A tone detector system in accordance with claim 13 wherein:

the first tuned amplifier circuit means includes first direct-coupled amplifier circuit means having an input circuit coupled to the audio signal supply circuit means and the first and second filter circuit means are first and second resistor-capacitor filter circuit means coupled between an input and an output circuit of the first direct-coupled amplifier circuit means for providing negative feedback paths therebetween, said first filter circuit means of said first tuned amplifier being constructed to have a substantial dip in its signal transfer characteristic at the frequency of the first audio tone of the first signal pair, and said second filter circuit means of the first tuned amplifier being constructed to have a substantial dip in its signal transfer characteristic at the frequency of the first audio tone of the second signal pair;

and the second tuned amplifier circuit means includes second direct-coupled amplifier circuit means having an input circuit coupled to the audio signal supply circuit means and the first and second filter circuit means are first and second resistor-capacitor filter circuit means coupled between an input and an output circuit of the second direct-coupled amplifier circuit means for providing negative feedback paths therebetween, said first filter circuit means of said second tuned amplifier being constructed to have a substantial dip in its signal transfer characteristic at the frequency of the second audio tone of the first signal pair, and said second filter circuit means of said second tuned amplifier being constructed to have a substantial dip in its signal transfer characteristic at the frequency of the second audio tone of the second signal pair.

15. A tone detector system in accordance with claim 14 wherein each of the resistor-capacitor filter circuit means in each of the tuned amplifier circuit means is a twin-T filter circuit.

16. A tone detector system in accordance with claim 14 wherein the control circuit means includes:

four coupling diodes individually connected in series between the output of a different one of the resistor-capacitor filter circuit means and the input of its direct-coupled amplifier circuit means;

first digital logic circuit means for disabling the coupling diodes associated with the two first filter circuit means when the mode selector switch is in one of its positions;

and second digital logic circuit means for disabling the coupling diodes associated with the two second filter circuit means when the mode selector switch is in the other of its positions.

17. A tone detector system for a radio telephone mobile unit for detecting first and second audiofrequency tone signals transmitted by a base station comprising:

circuit means for supplying audio signals received from the base station and detected by the mobile unit;

first tuned amplifier circuit means coupled to the audio signal supply circuit means for selectively amplifying signal components of the first audio frequency tone of one of two signal pairs, each signal pair having first and second audio frequency tones, such first tuned amplifier circuit means including first and second filter circuit means, said first filter circuit means of said first tuned amplifier circuit having a distinctive effect at the frequency of the first tone signal of the first signal pair, and said second filter circuit means of said first tuned amplifier circuit having a distinctive effect at the frequency of the first tone signal of the second signal pair;

second tuned amplifier circuit means coupled to the audio signal supply circuit means for selectively amplifying signal components of the second audio frequency tone of one of two signal pairs, each signal pair having first and second audio frequency tones, such second tuned amplifier circuit means including first and second filter circuit means, said first filter circuit means of said second tuned amplifier circuit having a distinctive effect at the frequency of the second tone signal of the first signal pair and said second filter circuit means of said second tuned amplifier circuit having a distinctive effect at the frequency of the second tone signal of the second signal pair;

a mode selector switch for signifying selection of a particular one of two operating modes for the mobile unit, said selection including choosing between two signal pairs;

control circuit means coupled to the mode selector switch and to the filter circuit means in the first and second tuned amplifier circuit means for enabling the first filter circuit means in each tuned amplifier circuit means and disabling the second filter circuit means in each tuned amplifier circuit means in one mobile unit operating mode and for enabling the second filter circuit means and disabling the first filter circuit means in the other mobile unit operating mode;

first tone-to-digital converter circuit means coupled to said first tuned amplifier circuit means for producing a tone signal indicative digital output signal during the occurrence of the first tone signal of the signal pair selected by said mode selector switch;

first digital logic circuit means coupled to the output of the first tone-to-digital converter circuit means for producing a tone signal indicative digital output signal during the occurrence of the first tone signal of the signal pair selected by said mode selector switch;

second tone-to-digital converter circuit means coupled to said second tuned amplifier circuit means for producing a tone signal indicative digital output signal during the occurrence of the second tone signal of the signal pair selected by said mode selector switch;

second digital logic circuit means coupled to the output of the second tone to digital converter circuit means for producing a tone signal indicative digital output signal during the occurrence of the second tone signal of the signal pair selected by said mode selector switch;

and circuit means cross-coupling the inputs and outputs of the first and second digital logic circuit means for causing a tone signal indicative digital output signal to appear at the output of only one of the digital logic circuit means at any given instant.

* * * * *